US011701946B2

(12) United States Patent
Kim et al.

(10) Patent No.: US 11,701,946 B2
(45) Date of Patent: Jul. 18, 2023

(54) AIR VENT FOR VEHICLE

(71) Applicants: HYUNDAI MOBIS CO., LTD., Seoul (KR); NIFCO KOREA INC., Asan-si (KR)

(72) Inventors: Won Sik Kim, Yongin-si (KR); Geun Heung Kim, Asan-si (KR)

(73) Assignees: HYUNDAI MOBIS CO., LTD, Seoul (KR); NIFCO KOREA INC., Asan-si (KR)

( * ) Notice: Subject to any disclaimer, the term of this patent is extended or adjusted under 35 U.S.C. 154(b) by 420 days.

(21) Appl. No.: 16/872,725

(22) Filed: May 12, 2020

(65) Prior Publication Data

US 2020/0361282 A1    Nov. 19, 2020

(30) Foreign Application Priority Data

May 13, 2019    (KR) .................. 10-2019-0055561

(51) Int. Cl.
*B60H 1/34* (2006.01)
*F24F 13/06* (2006.01)
*B60H 1/00* (2006.01)

(52) U.S. Cl.
CPC ....... *B60H 1/00685* (2013.01); *B60H 1/3414* (2013.01); *B60H 2001/3478* (2013.01)

(58) Field of Classification Search
CPC ........ B60H 1/00685; B60H 2001/3478; B60H 1/3414; B60H 1/3428; B60H 1/24; B60H 1/34; B60H 1/3435; B60H 2001/00635; B60H 1/3442
USPC ........................................................ 454/155
See application file for complete search history.

(56) References Cited

U.S. PATENT DOCUMENTS 3,736,858 A * 6/1973 Mercier ................ F24F 13/065
454/316

FOREIGN PATENT DOCUMENTS

| DE | 102018205881 B3 * | 5/2019 | |
| EP | 707992 A1 * | 4/1996 | ........... B60H 1/3428 |
| KR | 100726226 B1 * | 6/2007 | ......... B60H 1/00564 |
| KR | 100947444 B1 * | 3/2010 | ......... B60H 1/00685 |

(Continued)

OTHER PUBLICATIONS

KR 100947444 B1 English machine translation, Mar. 12, 2010 (Year: 2010).*

(Continued)

*Primary Examiner* — Steven B McAllister
*Assistant Examiner* — Cole N Friedman
(74) *Attorney, Agent, or Firm* — Morgan. Lewis & Bockius LLP

(57) ABSTRACT

An air vent for a vehicle may include: a duct part having an internal path through which air is moved; a first adjusting part rotatably installed in the duct part, and configured to guide the discharge direction of the air while rotated in a side-to-side direction; a second adjusting part rotatably installed in the duct part with the first adjusting part, and configured to guide the discharge direction of the air or block an air flow passing through the duct part, while rotated in a top-to-bottom direction; and an airtightness maintaining part fixed to the duct part facing the second adjusting part, and configured to block the movement of the air while brought into contact with the second adjusting part for opening/closing the duct part.

9 Claims, 19 Drawing Sheets

(56) References Cited

FOREIGN PATENT DOCUMENTS

KR  10-2010-0058374 A   6/2010
WO  WO-2018108690 A1 *  6/2018  ......... B60H 1/00685

OTHER PUBLICATIONS

Kim, KR 100726226 B1 English machine translation, Jun. 8, 2007 (Year: 2007).*
Peller, DE 102018205881 B3 English machine translation, May 9, 2019 (Year: 2019).*

* cited by examiner

AIR VENT FOR VEHICLE

CROSS-REFERENCE TO RELATED APPLICATION

This application claims priority from and the benefit of Korean Patent Application No. 10-2019-0055561, filed on May 13, 2019, which is hereby incorporated by reference for all purposes as if set forth herein.

BACKGROUND

Field

Exemplary embodiments of the present disclosure relate to an air vent for a vehicle, and more particularly, to an air vent for a vehicle, in which a part for controlling the direction of air in a top-to-bottom direction and a part for controlling an air flow are implemented as a single part, and which can provide improved sealing performance.

Discussion of the Background

In general, a vehicle includes an air conditioning system for adjusting the inside temperature thereof according to the season, and cool air and warm air which are generated by the air conditioning system are discharged to the inside of the vehicle through an air discharge port installed in an instrument panel.

The air discharge port has an air vent mounted thereon to adjust the direction and amount of warm air or cold air generated through the air conditioning system. That is, the warm air or cold air generated through the air conditioning system passes through a duct and then discharges to the inside of the vehicle through the air vent. At this time, a driver adjusts the direction of the discharged air by operating a knob installed on the air vent.

The conventional air vent separately includes a part for adjusting the direction of air in a top-to-bottom direction and a part for controlling an air flow moved through the air vent. Therefore, the manufacturing cost is increased. Furthermore, since an empty space is formed between the air vent and the duct, the empty space serves as a factor that reduces sealing performance and generates noise. Therefore, there is a need for a device capable of solving the problem.

The related art of the present invention is disclosed in Korean Patent Application No. 2010-0058374 published on Jun. 3, 2010 and entitled "Air Vent".

SUMMARY

Various embodiments are directed to an air vent for a vehicle, in which a part for controlling the direction of air in a top-to-bottom direction and a part for controlling an air flow are implemented as a single part, and which can provide improved sealing performance.

In an embodiment, an air vent for a vehicle may include: a duct part having an internal path through which air is moved; a first adjusting part rotatably installed in the duct part, and configured to guide the discharge direction of the air while rotated in a side-to-side direction; a second adjusting part rotatably installed in the duct part with the first adjusting part, and configured to guide the discharge direction of the air or block an air flow passing through the duct part, while rotated in a top-to-bottom direction; and an airtightness maintaining part fixed to the duct part facing the second adjusting part, and configured to block the movement of the air while brought into contact with the second adjusting part for opening/closing the duct part.

The first adjusting part may include: a first adjusting body rotatably installed in the duct part; and a side groove formed on a side surface of the first adjusting body, facing the second adjusting part.

The second adjusting part may include: a second adjusting body rotatably installed in the duct part; and a plate-shaped internal member fixed to a hollow portion formed in the second adjusting body.

The second adjusting body may have a cylindrical shape, and adjust the direction of the air passing through the inside of the duct part or block the movement of the air according to the rotation direction thereof.

The second adjusting part may include: an opening/closing part located on one side of the internal member, and configured to close the inside of the duct part when rotated and brought into contact with the airtightness maintaining part; and a base part installed at a position facing the opening/closing part with the internal member provided therebetween.

The opening/closing part may include: a curved body having a convexly curved surface formed on the outside thereof; and a first protrusion protruding from one side of the curved body, and brought into contact with the airtightness maintaining part when the curved main body blocks the inside of the duct part.

The opening/closing part may further include a second protrusion protruding from the other side of the curved body, and brought into contact with the airtightness maintaining part when the curved body blocks the inside of the duct part.

The curved surface formed on the outside of the base part may have a smaller curvature than the curved surface formed on the outside of the curved body.

The airtightness maintaining part may include: an elastic first sealing part protruding from one side of the duct part to the inside of the duct part, and configured to maintain airtightness while brought into contact with the opening/closing part, when the second adjusting part closes the duct part; and an elastic second sealing part protruding from the other side of the duct part to the inside of the duct part, and configured to maintain airtightness with the first sealing part while brought into contact with the opening/closing part, when the second adjusting part closes the duct part.

The first sealing part may include: a first sealing protrusion protruding to the inside of the duct part, and having a first side surface brought into contact with the opening/closing part; and a first extension extended from the first sealing protrusion and installed through the duct part.

The second sealing part may include: a second sealing protrusion protruding to the inside of the duct part, and having a second side surface brought into contact with the opening/closing part; and a second extension extended from the second sealing protrusion and installed through the duct part.

In accordance with the embodiment of the present disclosure, the function of a damper which adjusts the direction of air passing through the inside of the duct part or blocks the movement of the air is implemented by a single member, which makes it possible to reduce the manufacturing cost.

Furthermore, since the elastic airtightness maintaining part is brought into contact with the second adjusting part, the improved sealing performance can be provided, and the operation noise of the second adjusting part can be reduced.

DETAILED DESCRIPTION OF THE ILLUSTRATED EMBODIMENTS

Hereinafter, an air vent for a vehicle will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
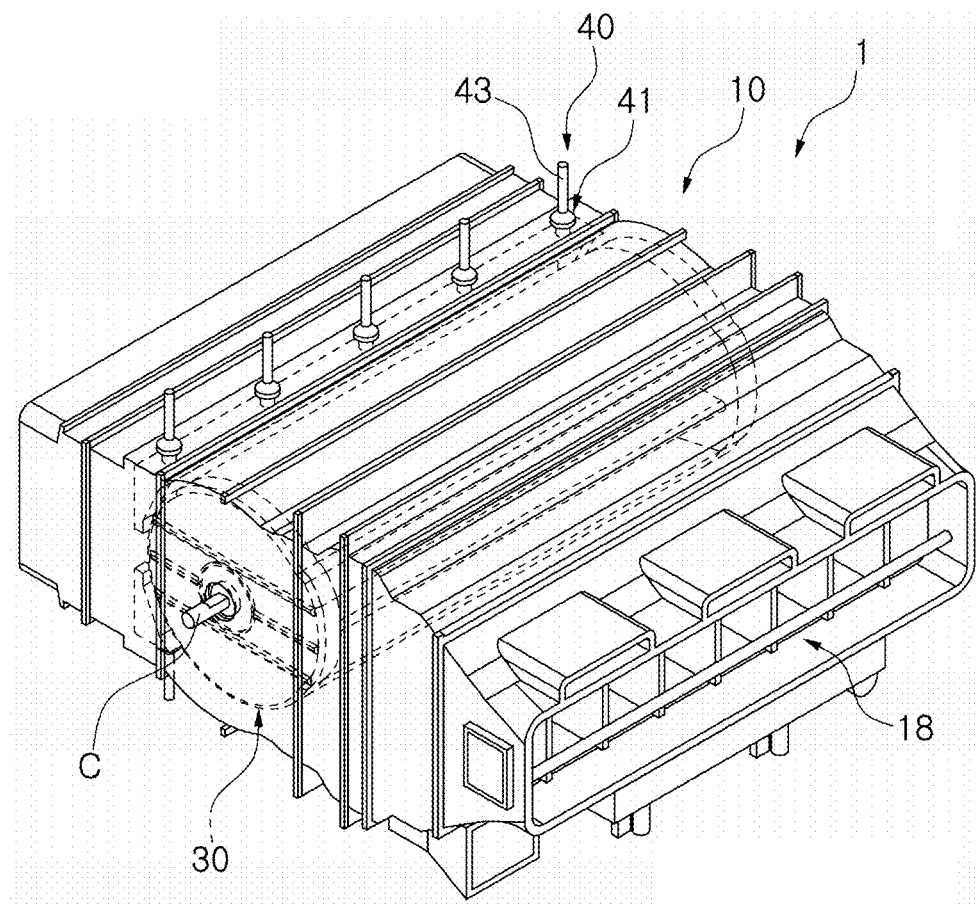
FIG. 1 is a perspective view schematically illustrating a structure of an air vent for a vehicle in accordance with an embodiment of the present disclosure.
Figure 2:
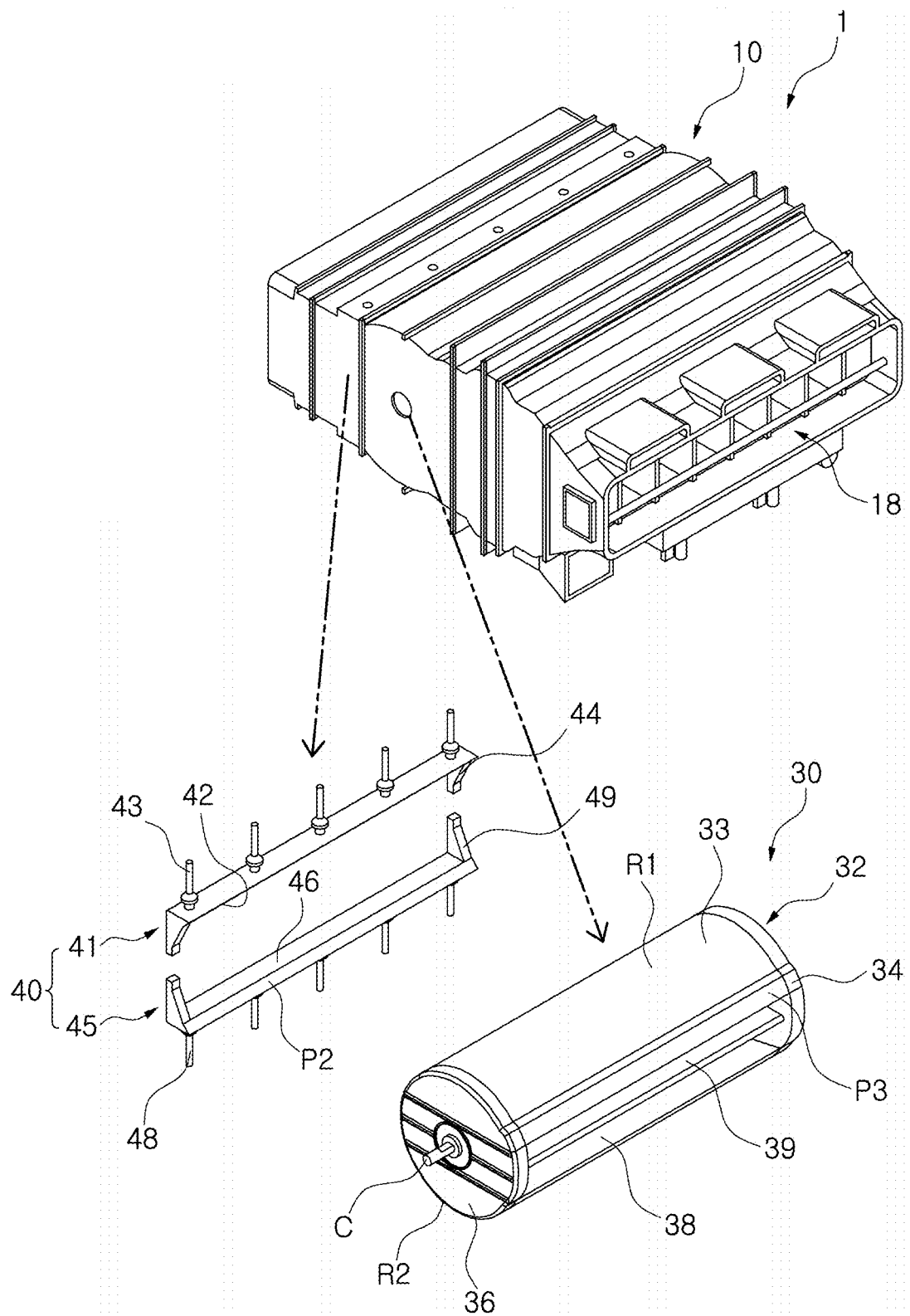
FIG. 2 is an exploded perspective view illustrating main parts of the air vent for a vehicle in accordance with the embodiment of the present disclosure.
Figure 3:
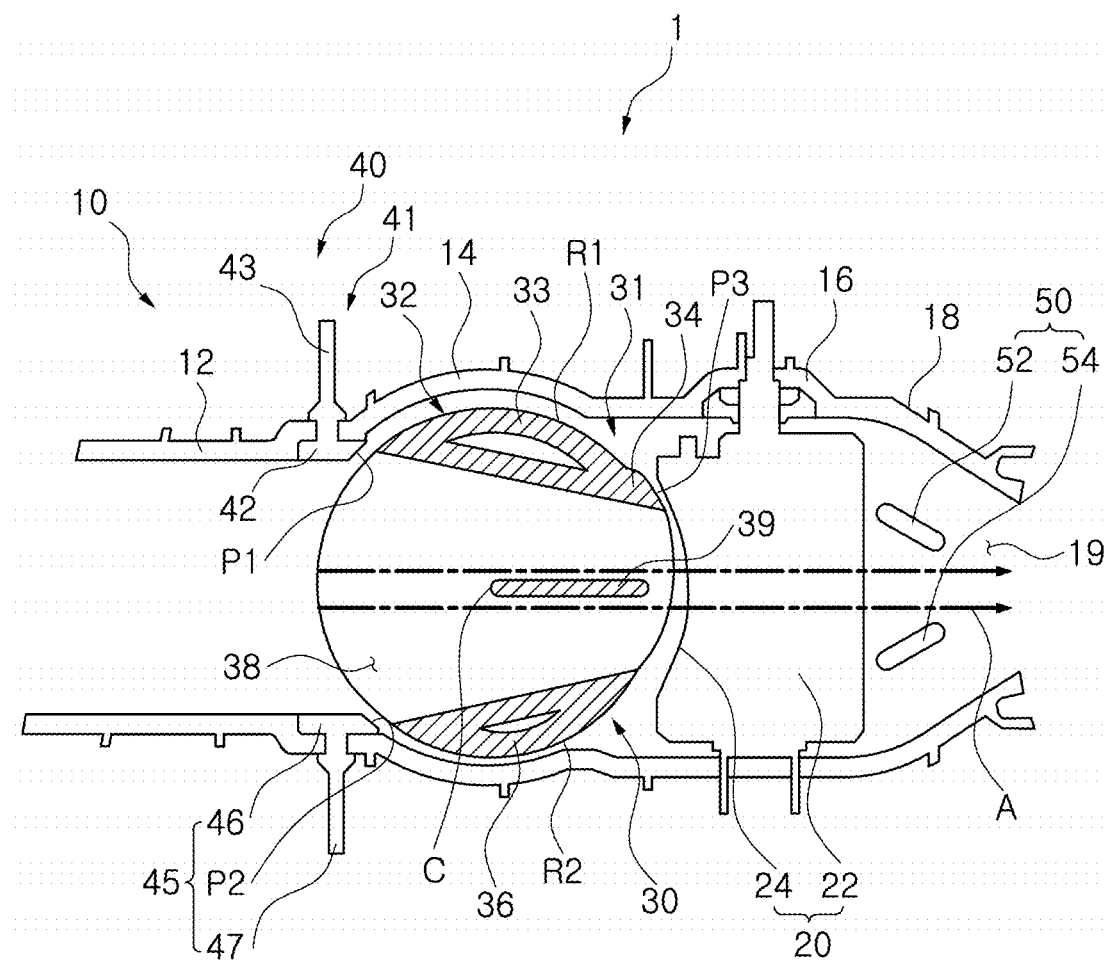
FIG. 3 is a cross-sectional view illustrating that air discharged from the air vent for a vehicle in accordance with the embodiment of the present disclosure moves forward.
Figure 4:
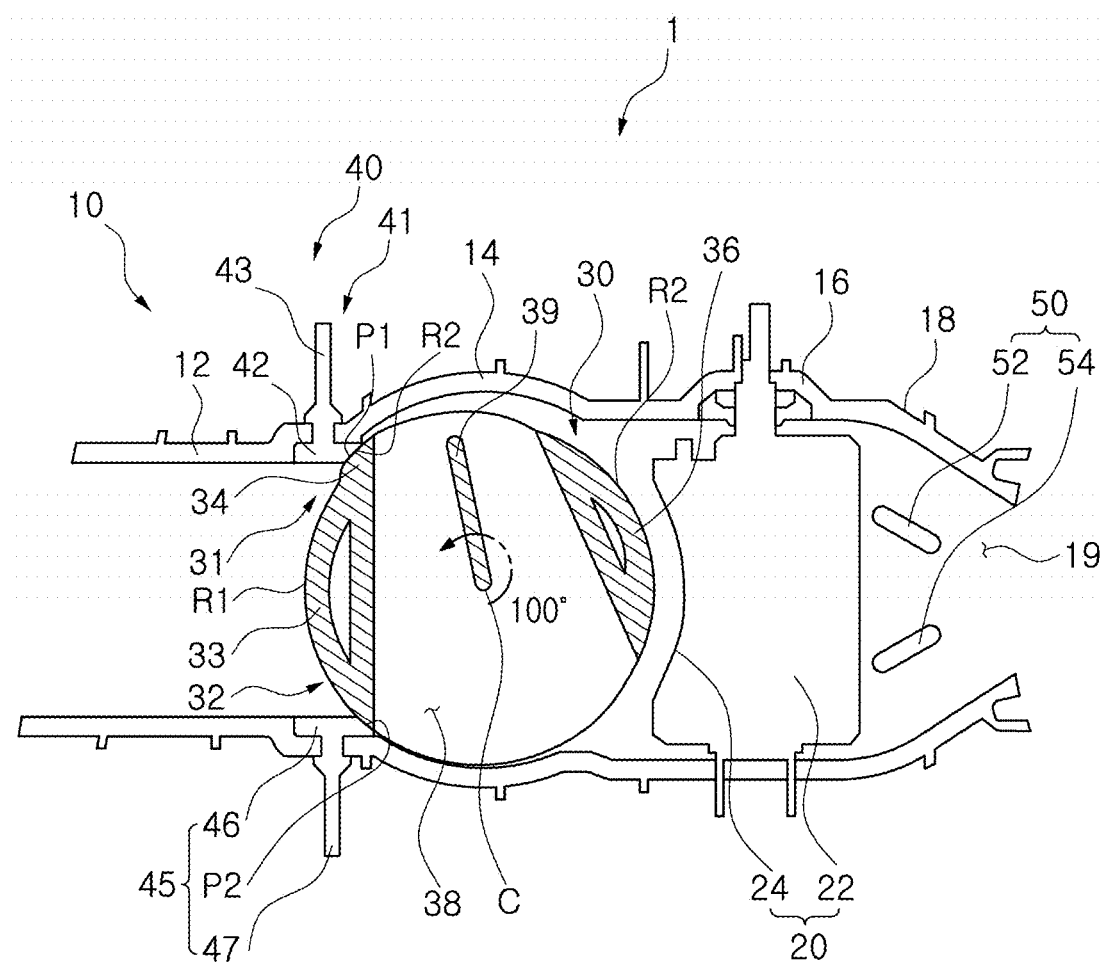
FIG. 4 is a side view illustrating that a second adjusting part in accordance with the embodiment of the present disclosure is operated in a close state.
Figure 5:
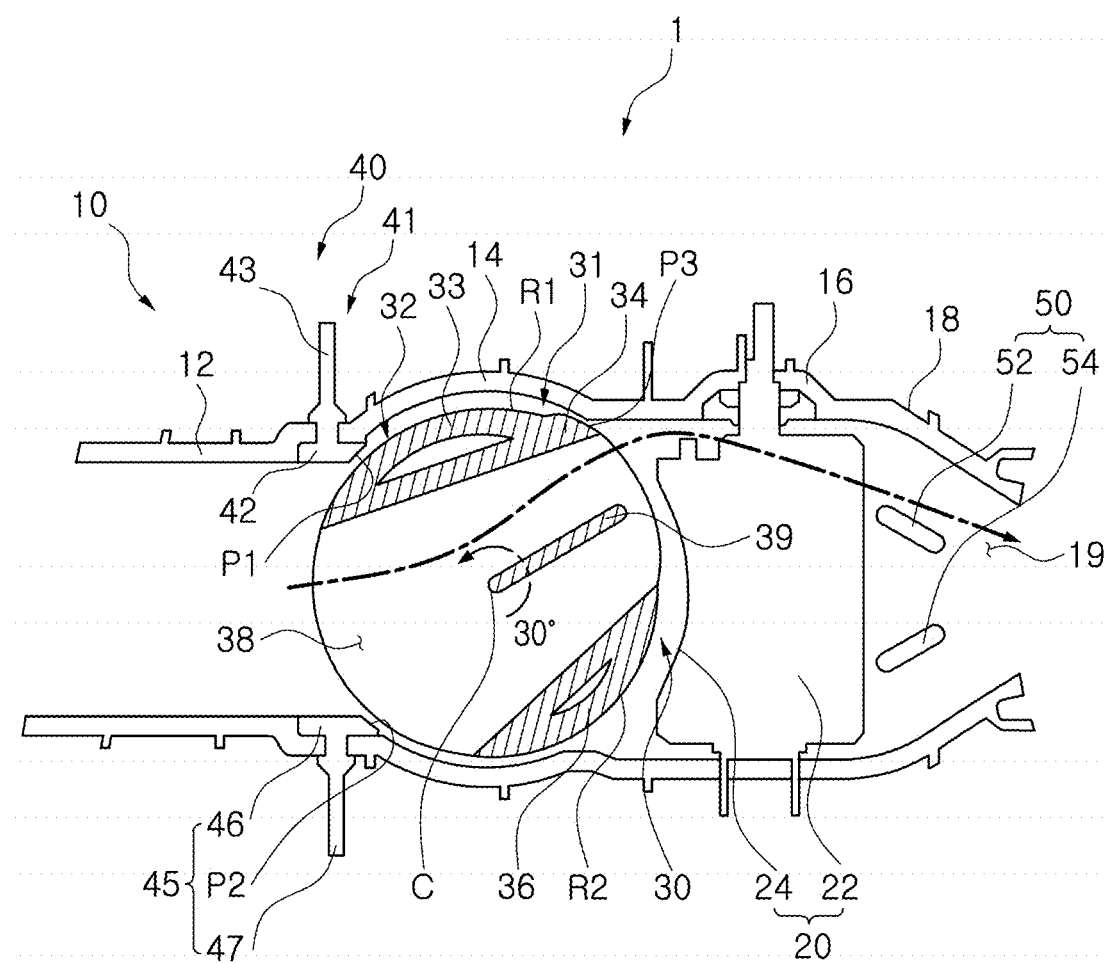
FIG. 5 is a cross-sectional view illustrating that air discharged from the air vent for a vehicle in accordance with the embodiment of the present disclosure moves downward.
Figure 6:
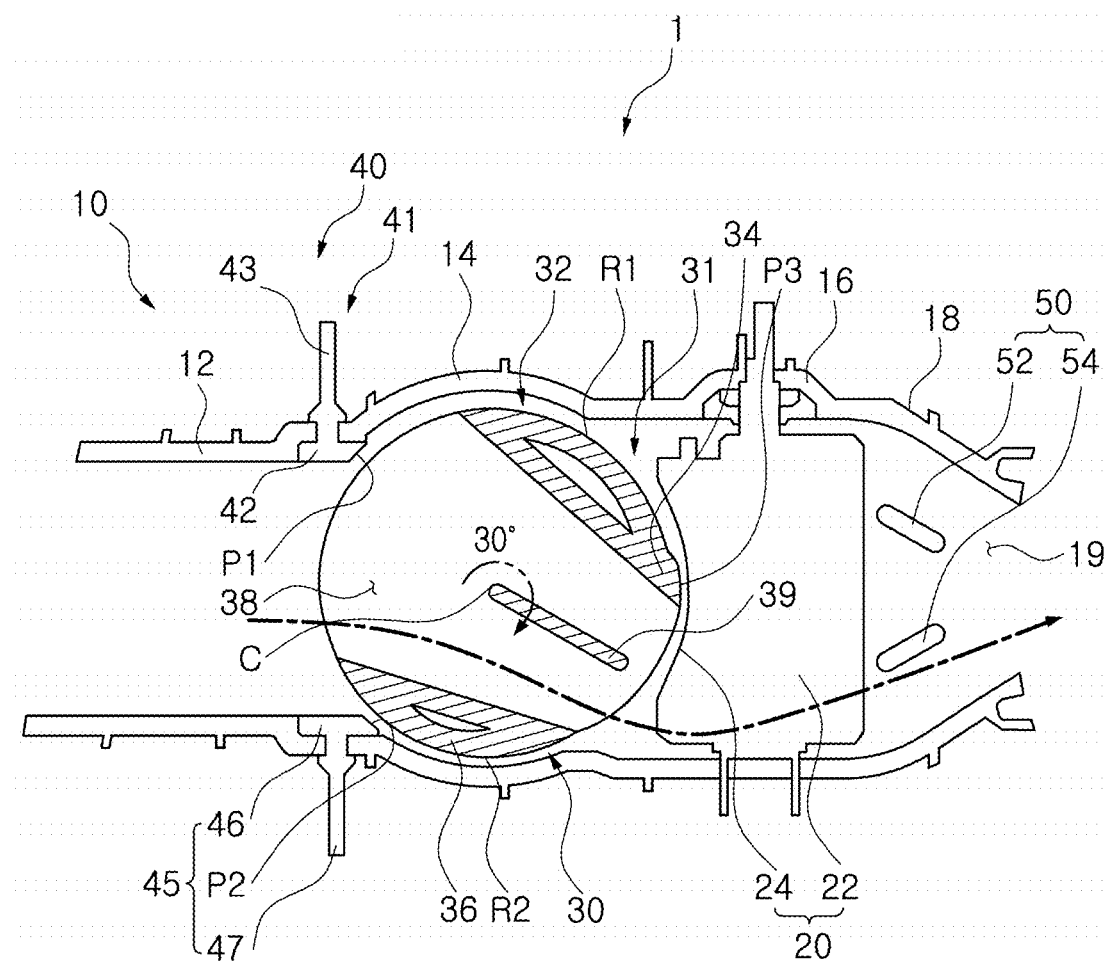
FIG. 6 is a cross-sectional view illustrating that air discharged from the air vent for a vehicle in accordance with the embodiment of the present disclosure moves upward.
Figure 7:
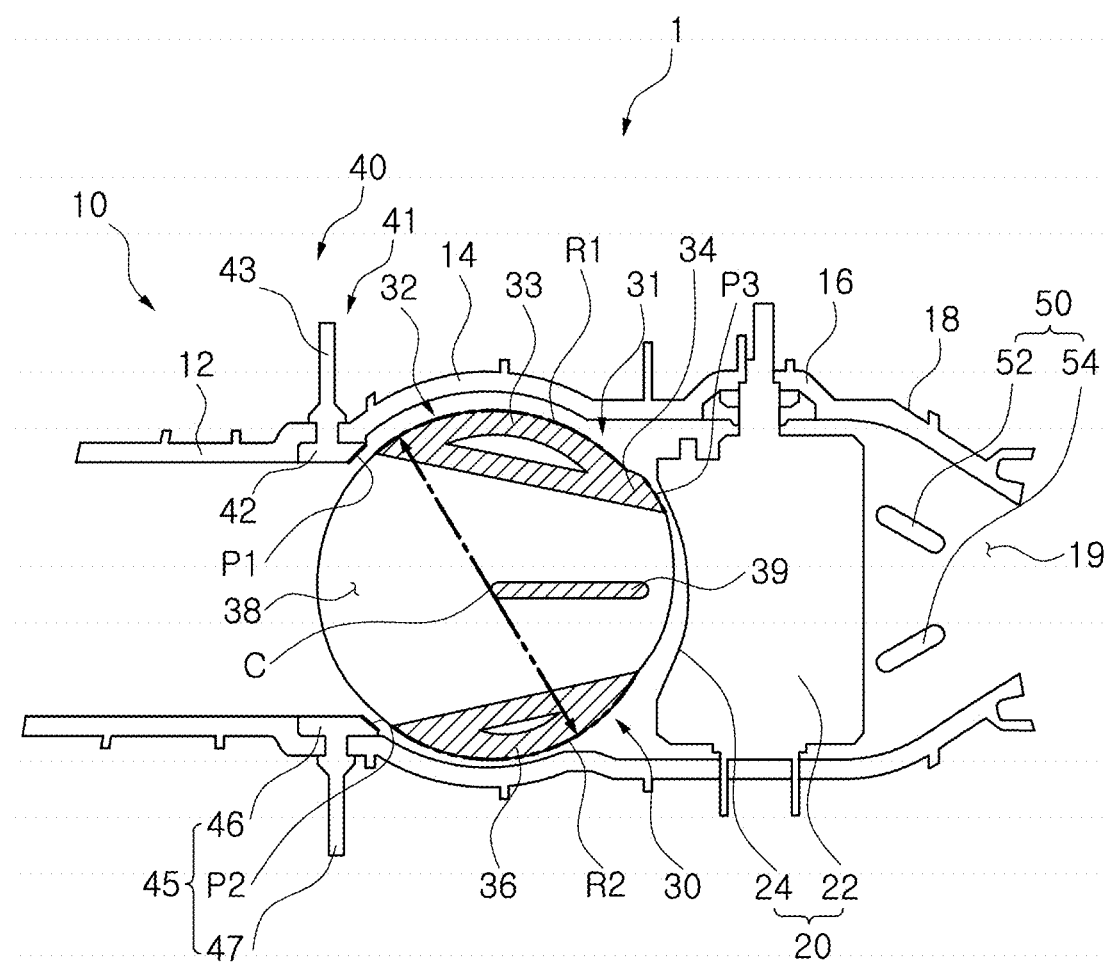
FIG. 7 is a side view illustrating that the second adjusting part in accordance with the embodiment of the present disclosure is operated in an open state.

FIG. 1 is a perspective view schematically illustrating a structure of an air vent for a vehicle in accordance with an embodiment of the present disclosure, FIG. 2 is an exploded perspective view illustrating main parts of the air vent for a vehicle in accordance with the embodiment of the present disclosure, FIG. 3 is a cross-sectional view illustrating that air discharged from the air vent for a vehicle in accordance with the embodiment of the present disclosure moves forward, FIG. 4 is a side view illustrating that a second adjusting part in accordance with the embodiment of the present disclosure is operated in a close state, FIG. 5 is a cross-sectional view illustrating that air discharged from the air vent for a vehicle in accordance with the embodiment of the present disclosure moves downward, FIG. 6 is a cross-sectional view illustrating that air discharged from the air vent for a vehicle in accordance with the embodiment of the present disclosure moves upward, and FIG. 7 is a side view illustrating that the second adjusting part in accordance with the embodiment of the present disclosure is operated in an open state.

As illustrated in FIGS. 1 to 7, the air vent 1 for a vehicle in accordance with the embodiment of the present disclosure includes a duct part 10, a first adjusting part 20, a second adjusting part 30 and an airtightness maintaining part 40. The duct part 10 has an internal path through which air is moved. The first adjusting part 20 is rotatably installed in the duct part 10, and guides the discharge direction of air, while rotated in a side-to-side direction. The second adjusting part 30 is rotatably installed in the duct part 10 with the first adjusting part 20, and guides the discharge direction of air or blocks an air flow passing through the duct part 10 while rotated in a top-to-bottom direction. The airtightness maintaining part 40 is fixed to the duct part 10 facing the second adjusting part 30, and blocks the movement of the air while being in contact with the second adjusting part 30 for opening and closing the duct part 10. The air vent 1 for a vehicle in accordance with the embodiment of the present disclosure may further include a flow path guide part 50 and a driving part.

The duct part 10 is a pipe line with an internal path through which air is moved, the first adjusting part 20, the second adjusting part 30 and the flow path guide part 50 are installed in the duct part 10, and the airtightness maintaining part 40 is fixed to the top and bottom of the duct part 10. The duct part 10 in accordance with the embodiment of the present disclosure includes a first connection duct 12, a curved duct 14, a second connection duct 16 and an exit duct 18.

The air is moved toward the second adjusting part 30, and guided through the first connection duct 12. The curved duct 14 is connected to the rear (right based on FIG. 3) of the first connection duct 12, and the second connection duct 16 and the exit duct 18 are sequentially connected to the rear surface of the curved duct 14.

The curved duct 14 has an inner surface that is curved along the outer shape of the second adjusting part 30, and the second adjusting part 30 is rotatably installed in the curved duct 14. The first adjusting part 20 is rotatably installed in the second connection duct 16.

The flow path guide part 50 is installed in the exit duct 18, and the exit duct 18 has an internal space which is gradually narrowed toward the rear side where a discharge port 19 is formed.

The first adjusting part 20 is rotatably installed in the duct part 10, and guides the air to discharge to the left or right while rotated in the side-to-side direction. The first adjusting part 20 in accordance with the embodiment of the present disclosure includes a first adjusting body 22 and a side groove 24. Inside the duct part 10, the plurality of first adjusting parts 20 are installed.

The first adjusting body 22 is rotatably installed in the duct part 10, and extended in the top-to-bottom direction. The first adjusting body 22 having a rectangular plate shape is erected in the second connection duct 16. The plurality of first adjusting bodies 22 are connected through a link and rotated together.

The side groove 24 is formed on a side surface of the first adjusting body 22, facing the second adjusting part 30. Therefore, when the second adjusting part 30 is rotated, the concave shape of the side groove 24 prevents the second adjusting part 30 from interfering with the first adjusting part 20.

The first adjusting part 20 can adjust an air flow A in the side-to-side direction of the air vent 1 for a vehicle. Since the first adjusting part 20 is directly connected to an actuator (not illustrated) installed outside the duct part 10 and rotated, it is possible to minimize the number of parts.

The second adjusting part 30 may be rotatably installed in the duct part 10 with the first adjusting part 20, and formed in various shapes as long as the second adjusting part 30 can guide the discharge direction of air or block an air flow passing through the duct part 10, while rotated in the top-to-bottom direction. The second adjusting part 30 in accordance with the embodiment of the present disclosure includes a second adjusting body 31 and an internal member 39.

The second adjusting body 31 is rotatably installed in the duct part 10, and receives power from the driving part connected thereto. The second adjusting body 31 in accordance with the embodiment of the present disclosure has a cylindrical shape, and guides the air flow A based on the direction of a hollow portion 38 formed through the second adjusting body 31. The hollow portion 38 has an entrance and exit, and the entrance has a larger cross-sectional area than the exit.

The internal member 39 is formed in a plate shape, fixed to the inside of the hollow portion 38, and installed to extend in the side-to-side width direction of the hollow portion 38.

The second adjusting body 31 in accordance with the embodiment of the present disclosure is rotated by the driving part (not illustrated) connected thereto, and adjusts the direction of air passing through the inside of the duct part 10 or blocks the movement of the air, according to the rotation direction thereof. The rotation of the second adjusting body 31 in the top-to-bottom direction may adjust the air flow A, passing through the second adjusting part 30, in the top-to-bottom direction.

The second adjusting part 30 in accordance with the embodiment of the present disclosure includes an opening/closing part 32 and a base part 36. The opening/closing part 32 is located on one side of the internal member, and rotated and brought into contact with the airtightness maintaining part 40 so as to close the inside of the duct part 10, and the base part 36 is installed at a position facing the opening/closing part 32, with the internal member provided therebetween.

The opening/closing part 32 is extended in the widthwise direction of the air vent 1 for a vehicle. The inside of the opening/closing part 32 faces the hollow portion 38, and the outside of the opening/closing part 32 faces the curved duct 14. The opening/closing part 32 in accordance with the embodiment of the present disclosure includes a curved body 33 and a first protrusion 34. The curved body 33 has a convexly curved surface formed on the outside thereof, and the first protrusion 34 protrudes from one side of the curved body 33, and is brought into contact with the airtightness maintaining part 40 when the curved body 33 blocks the inside of the duct part 10.

The curved body 33 has an outer curved surface which faces the curved duct 14 and is referred to as a first curved surface R1. The first protrusion 34 protruding from one side of the curved body 33 has an outer curved surface which faces the curved duct 14 and is referred to as a first contact curved surface P3.

The base part 36 is also extended in the widthwise direction of the air vent 1 for a vehicle. The inside of the base part 36 faces the hollow portion 38, and the outside of the base part 36 faces the curved duct 14. When the opening/closing part 32 is located at the top inside the curved duct 14, the base part 36 is located under the opening/closing part 32.

The airtightness maintaining part 40 may be fixed to the duct part 10 facing the second adjusting part 30, and modified in various shapes as long as the airtightness maintaining part 40 can block an air flow while brought into contact with the second adjusting part 30 for opening/closing the duct part 10. The airtightness maintaining part 40 in accordance with the embodiment of the present disclosure includes a first sealing part 41 and a second sealing part 45.

The first sealing part 41 is an elastic sealing member which protrudes from one side (hereafter, top side in FIG. 7) of the duct part 10 to the inside of the duct part 10, and is brought into contact with the opening/closing part 32 to maintain the airtightness when the second adjusting part 30 closes the duct part 10. The first sealing part 41 in accordance with the embodiment of the present disclosure includes a first sealing protrusion 42, a first extension 43 and a first side member 44.

The first sealing protrusion 42 protrudes to the inside of the duct part 10, and has a first side surface P1 which is brought into contact with the opening/closing part 32. The first sealing protrusion 42 is installed at a position facing the second adjusting part 30, and has a rod shape extended in the widthwise direction of the duct part 10. A side surface of the first sealing protrusion 42, facing the second adjusting part 30, corresponds to the first side surface P1 which is obliquely formed.

The first extension 43 is installed in such a shape that is extended from the first sealing protrusion 42 through the duct part 10, and extended in the top-to-bottom direction. The plurality of first extensions 43 are installed along the first sealing protrusion 42, and serve to fix the first sealing protrusion 42 to the duct part 10.

The first side member 44 is extended from either side of the first sealing protrusion 42 in the top-to-bottom direction, and abuts on the inside of the duct part 10.

The second sealing part 45 is an elastic sealing member which protrudes from the other side (hereafter, bottom side in FIG. 7) of the duct part 10 to the inside of the duct part 10, and is brought into contact with the opening/closing part 32 to maintain the airtightness with the first sealing part 41, when the second adjusting part 30 closes the duct part 10. The second sealing part 45 in accordance with the embodiment of the present disclosure includes a second sealing protrusion 46, a second extension 48 and a second side member 49.

The second sealing protrusion 46 protrudes to the inside of the duct part 10, and has a second side surface P2 which is brought into contact with the opening/closing part 32. The second sealing protrusion 46 is installed at a position facing the second adjusting part 30, and has a rod shape extended in the widthwise direction of the duct part 10. A side surface of the second sealing protrusion 46, facing the second adjusting part 30, corresponds to the second side surface P2 which is obliquely formed.

The second extension 48 is installed in such a shape that is extended from the second sealing protrusion 46 through the duct part 10, and extended in the top-to-bottom direction. The plurality of second extensions 48 are installed along the second sealing protrusion 46, and serve to fix the second sealing protrusion 46 to the duct part 10.

The second side member 49 is extended from either side of the second sealing protrusion 46 in the top-to-bottom direction, and abuts on the inside of the duct part 10.

When the first sealing part 41 is located at the top of the duct part 10, the second sealing part 45 is located under the first sealing part 41. On the other hand, when the first sealing part 41 is located at the bottom of the duct part 10, the second sealing part 45 is located over the first sealing part 41.

When the second adjusting part 30 is rotated so that both sides of the hollow portion 38 face the curved duct 14, the air flow A moved along the first connection duct 12 is blocked by the second adjusting part 30 and prevented from moving to the discharge port 19. The function of guiding the air flow A in the top-to-bottom direction and blocking or allowing the air flow A through the rotation of the second adjusting part 30 can be implemented through the second adjusting part 30 which is a single part. Therefore, as the number of parts is reduced, the size of the air vent 1 for a vehicle in accordance with the embodiment of the present disclosure can be reduced to improve the interior of a vehicle in which the air vent 1 for a vehicle is installed.

In the air vent 1 for a vehicle in accordance with the embodiment of the present disclosure, the second adjusting part 30 can adjust the air flow A in the top-to-bottom direction of the air vent 1, and block the air flow A passing through the duct part 10. Since the second adjusting part 30 is directly connected to the driving part installed outside the duct part 10 and rotated, the number of parts can be minimized.

The flow path guide part 50 is installed between the second adjusting part 30 and the discharge port 19 of the duct part 10, and guides air to the discharge port 19, the air having passed through the second adjusting part 30. In the present embodiment, the plurality of flow path guide parts 50 may be obliquely installed in the duct part 10, in order to guide the air flow A more reliably.

The flow path guide part 50 in accordance with the embodiment of the present disclosure includes a first guide 52 and a second guide 54, and the second guide 54 is installed under the first guide 52. The first guide 52 and the second guide 54 have a plate shape and are obliquely installed in the duct part 10.

Based on a virtual horizontal line passing through the center of the exit duct 18, the first guide 52 is located over the horizontal line, and the second guide 54 is located under the horizontal line. The first guide 52 is extended in a downward oblique direction, and the second guide 54 is extended in an upward oblique direction.

Therefore, the air flow A may be formed in a straight direction through a space formed between the first and second guides 52 and 54. Furthermore, the air flow A may be discharged downward through a space formed between the first guide 52 and the duct part 10. Alternatively, the air flow A may be discharged upward through a space formed between the second guide 54 and the duct part 10.

The air flow A passing between the first guide 52 and the duct part 10 moves upward at the front (the left based on FIG. 1) of the first guide 52 based on the first guide 52, and the air flow A having passed through the first guide 52 moves downward. At this time, since the first guide 52 has a plate shape installed in a downward oblique direction toward the discharge port, the first guide 52 can more stably guide the air flow A passing between the first guide 52 and the duct part 10.

The air flow A passing between the second guide 54 and the duct part 10 moves downward at the front of the second guide 54 based on the second guide 54, and the air flow A having passed through the second guide 54 moves upward. At this time, since the second guide 54 has a plate shape installed in an upward oblique direction toward the discharge port, the second guide 54 can more stably guide the air flow A passing between the second guide 54 and the duct part 10.

As illustrated in FIG. 7, a second curved surface R2 formed on the outside of the base part 36 has a smaller curvature than the first curved surface R1 formed on the outside of the curved body 33. Since the curvatures of the first and second curved surfaces R1 and R2 are different from each other, the operability and the sealing performance of the airtightness maintaining part 40 and the curved duct 14 can be improved when the second adjusting part 30 is rotated.

In order to secure the sealing performance and operability of the second adjusting part 30, the curvature of the first curved surface R1 may be set to a larger value than that of the second curved surface R2. At this time, since the second adjusting part 30 is rotated in the counterclockwise direction (based on FIG. 7) and brought into contact with the airtightness maintaining part 40, the second adjusting part 30 blocks the discharge of air through the duct part 10.

When the air is discharged downward or upward by the rotation of the second adjusting part 30, a gap is secured between the first curved surface R1 and the first side surface P1 and between the second curved surface R2 and the second side surface P2, such that interference does not occur when the second adjusting part 30 is rotated.

In a close mode in which the second adjusting part 30 closes the duct part 10, the first contact curved surface P3 is brought into contact with the first side surface P1, and the first curved surface R1 is brought into contact with the second side surface P2. Thus, in the close mode, the gap between the first contact curved surface P3 and the first side surface P1 is minimized or adjusted to maintain the contact state. Furthermore, in the close mode, the gap between the first curved surface R1 and the second side surface P2 may be minimized or adjusted to maintain the contact state.

Figure 8:
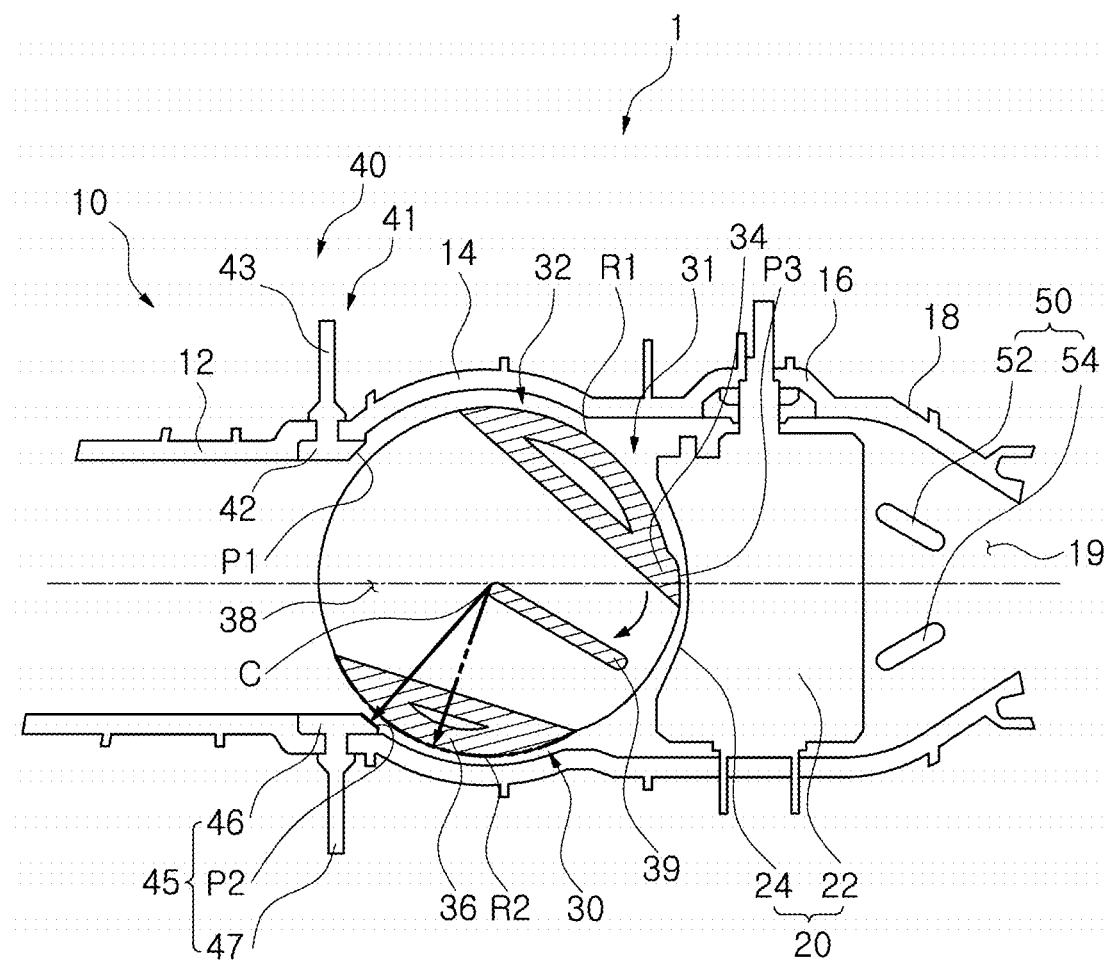
FIG. 8 is a cross-sectional view illustrating that the second adjusting part in accordance with the embodiment of the present disclosure is rotated downward.
Figure 9:
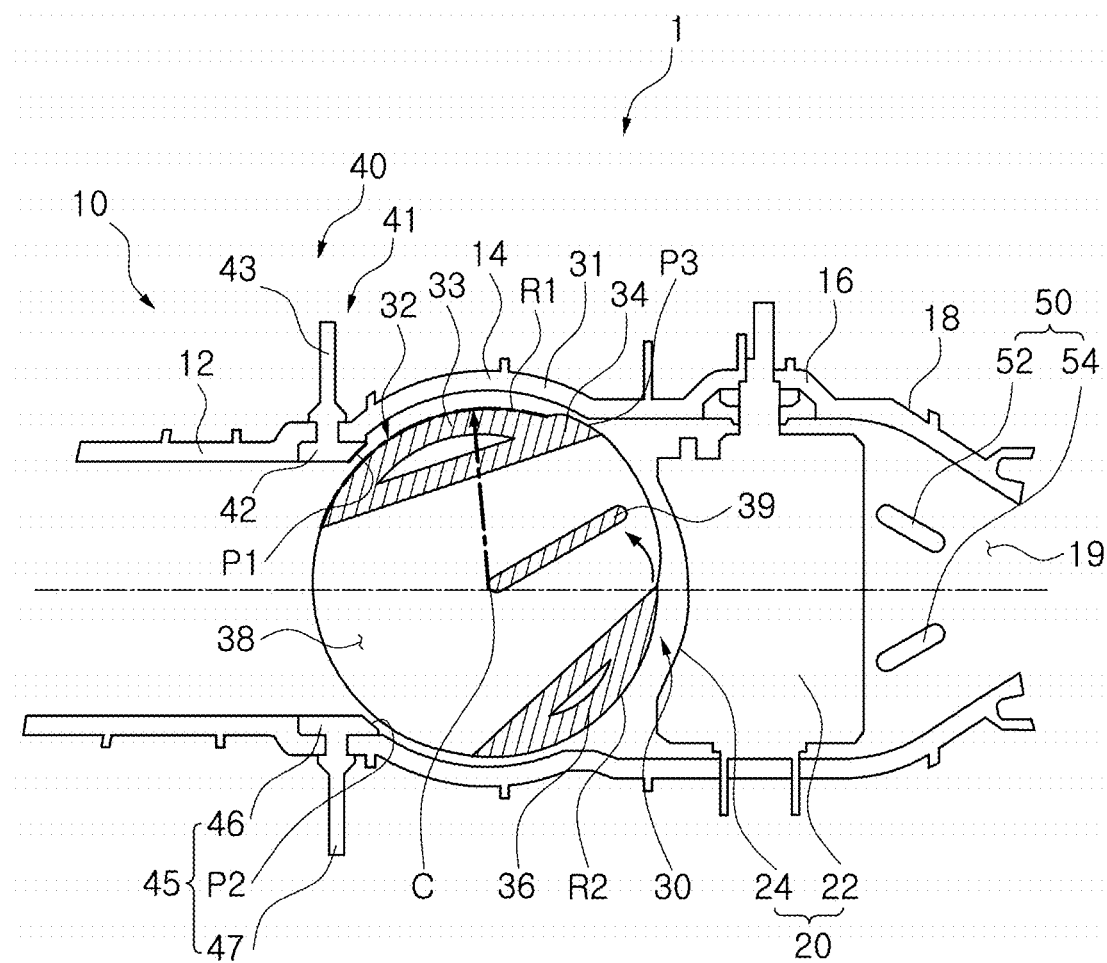
FIG. 9 is a cross-sectional view illustrating that the second adjusting part in accordance with the embodiment of the present disclosure is rotated upward.
Figure 10:
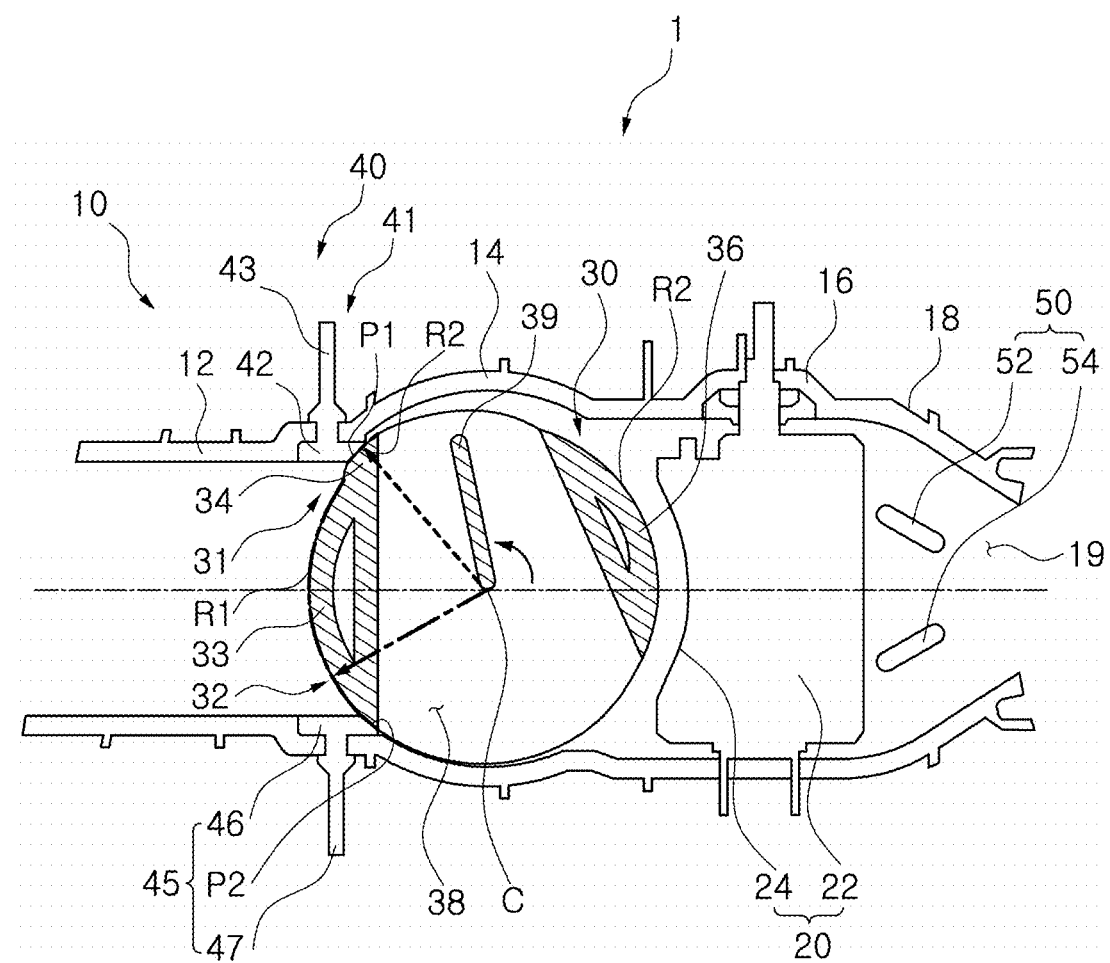
FIG. 10 is a cross-sectional view illustrating that the second adjusting part in accordance with the embodiment of the present disclosure is brought into contact with an airtightness maintaining part.

FIG. 8 is a cross-sectional view illustrating that the second adjusting part in accordance with the embodiment of the present disclosure is rotated downward, FIG. 9 is a cross-sectional view illustrating that the second adjusting part in accordance with the embodiment of the present disclosure is rotated upward, and FIG. 10 is a cross-sectional view illustrating that the second adjusting part in accordance with the embodiment of the present disclosure is brought into contact with the airtightness maintaining part.

As illustrate in FIG. 8, when the second adjusting part 30 is rotated downward obliquely to operate in an upward air blowing mode, an operation gap is secured between the second curved surface R2 and the second side surface P2 in order to avoid interference within the rotation region of the second adjusting part 30. Therefore, the distance from the rotation center C of the second adjusting part 30 to the second curved surface R2 is smaller than the distance between the rotation center C of the second adjusting part 30 to the second side surface P2.

As illustrated in FIG. 9, when the second adjusting part 30 is rotated upward obliquely to operate in a downward air blowing mode, an operation gap is secured between the first curved surface R1 and the first side surface P1 in order to avoid interference within the rotation region of the second adjusting part 30.

As illustrated in FIG. 10, when the movement of the air is blocked because the second adjusting part 30 is rotated in the counterclockwise direction so as to close the duct part 10, the first contact curved surface P3 is brought into contact with the first side surface P1, and the first curved surface R1 is brought into contact with the second side surface P2. At this time, the space in which the first contact curved surface P3 and the first side surface P1 are brought into contact with each other or spaced apart from each other may be minimized, and the first contact curved surface P3 and the first side surface P1 may be brought into contact with each other so as to overlap each other. At this time, the space in which the first curved surface R1 and the second side surface P2 are brought into contact with each other or spaced apart from each other may be minimized, and the first curved surface R1 and the second side surface P2 may be brought into contact with each other so as to overlap each other.

Figure 11:
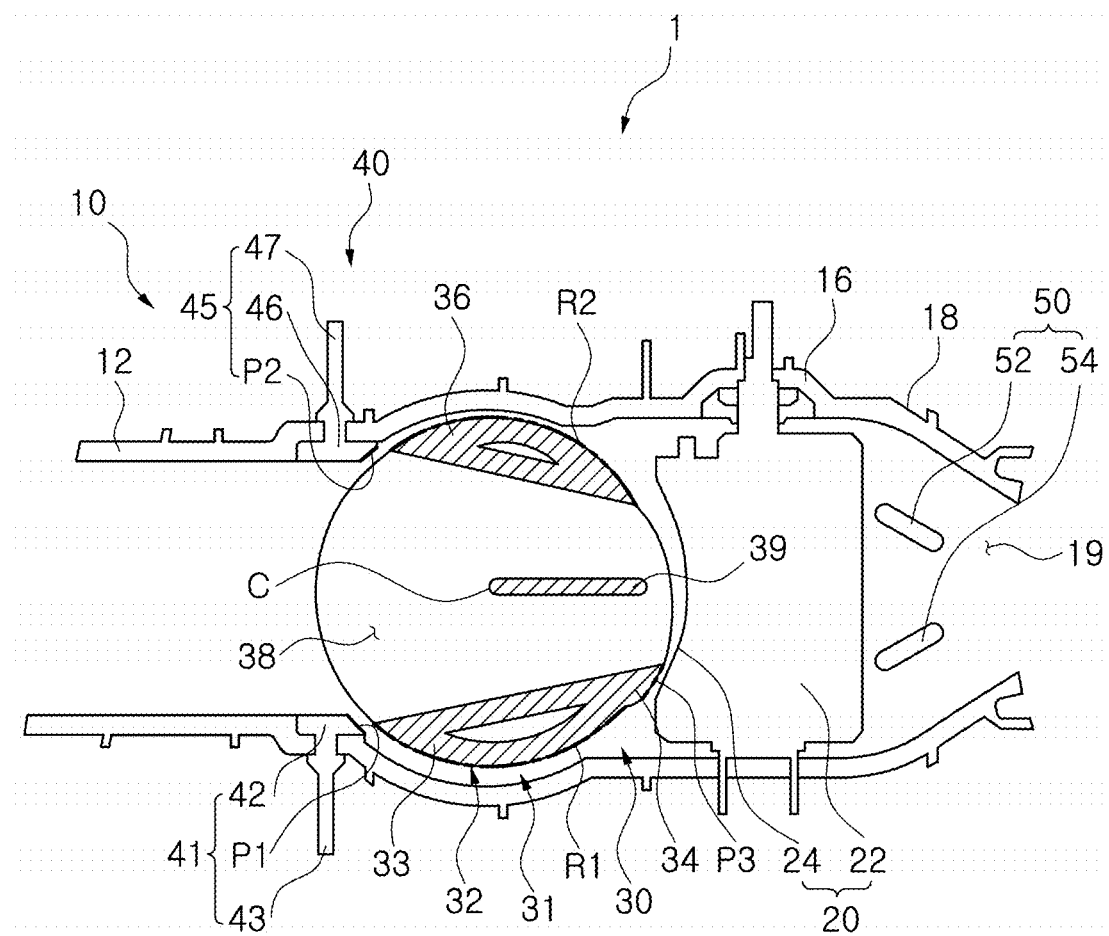
FIG. 11 is a cross-sectional view illustrating that an opening/closing part of the second adjusting part in accordance with the embodiment of the present disclosure is located at the bottom and a base part is located at the top.
Figure 12:
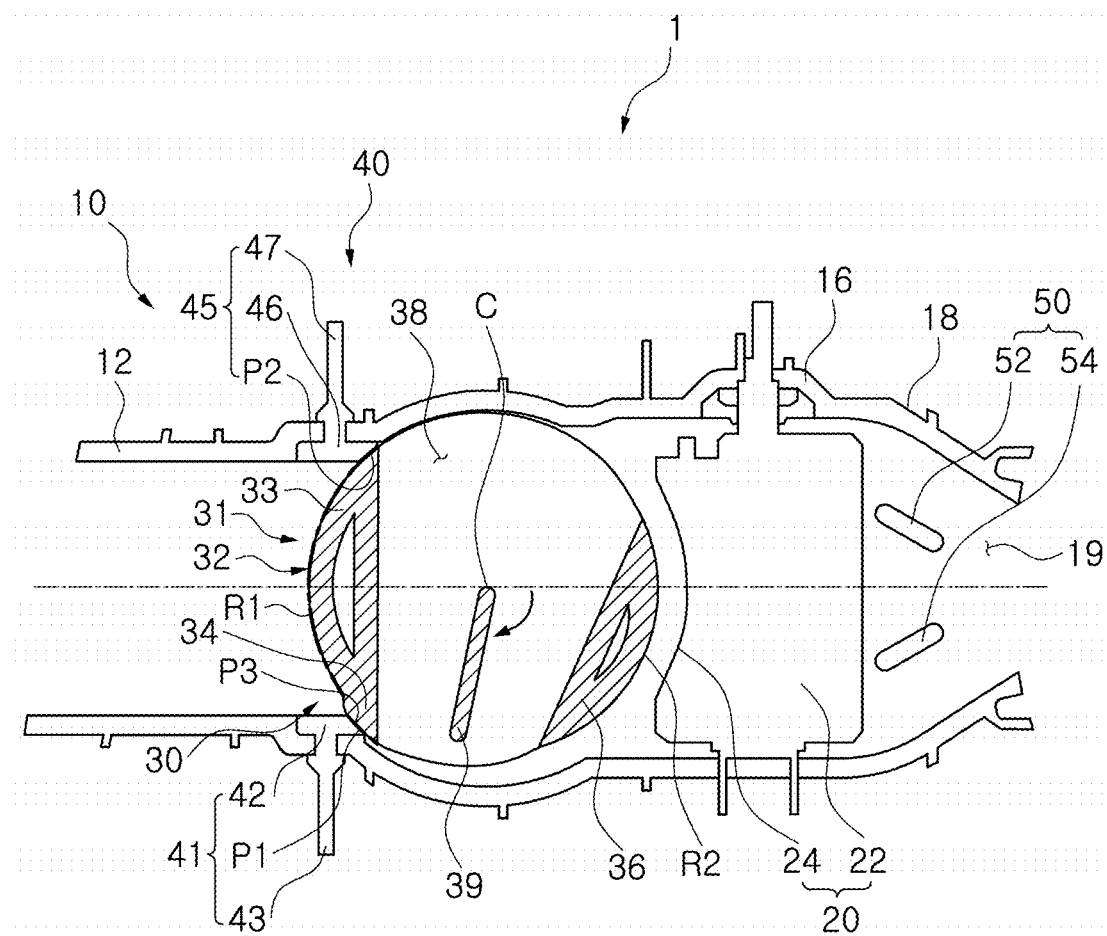
FIG. 12 is a cross-sectional view illustrating that the second adjusting part in accordance with the embodiment of the present disclosure is rotated in the clockwise direction to close the duct part.

FIG. 11 is a cross-sectional view illustrating that the opening/closing part of the second adjusting part in accordance with the embodiment of the present disclosure is located at the bottom and the base part is located at the top, and FIG. 12 is a cross-sectional view illustrating that the second adjusting part in accordance with the embodiment of the present disclosure is rotated in the clockwise direction to close the duct part.

As illustrated in FIGS. 11 and 12, when the second adjusting part 30 is rotated in the clockwise direction to close the internal flow path of the duct part 10, the opening/closing part 32 is located under the second adjusting part 30, and the base part 36 is located over the second adjusting part 30.

The first sealing part 41 of the airtightness maintaining part 40 is located at the bottom of the duct part 10, and the second sealing part 45 is located at the top of the duct part 10. The second adjusting part 30 is rotated in the clockwise direction to come into contact with the airtightness maintaining part 40, and thus blocks the discharge of the air through the duct part 10.

Figure 13:
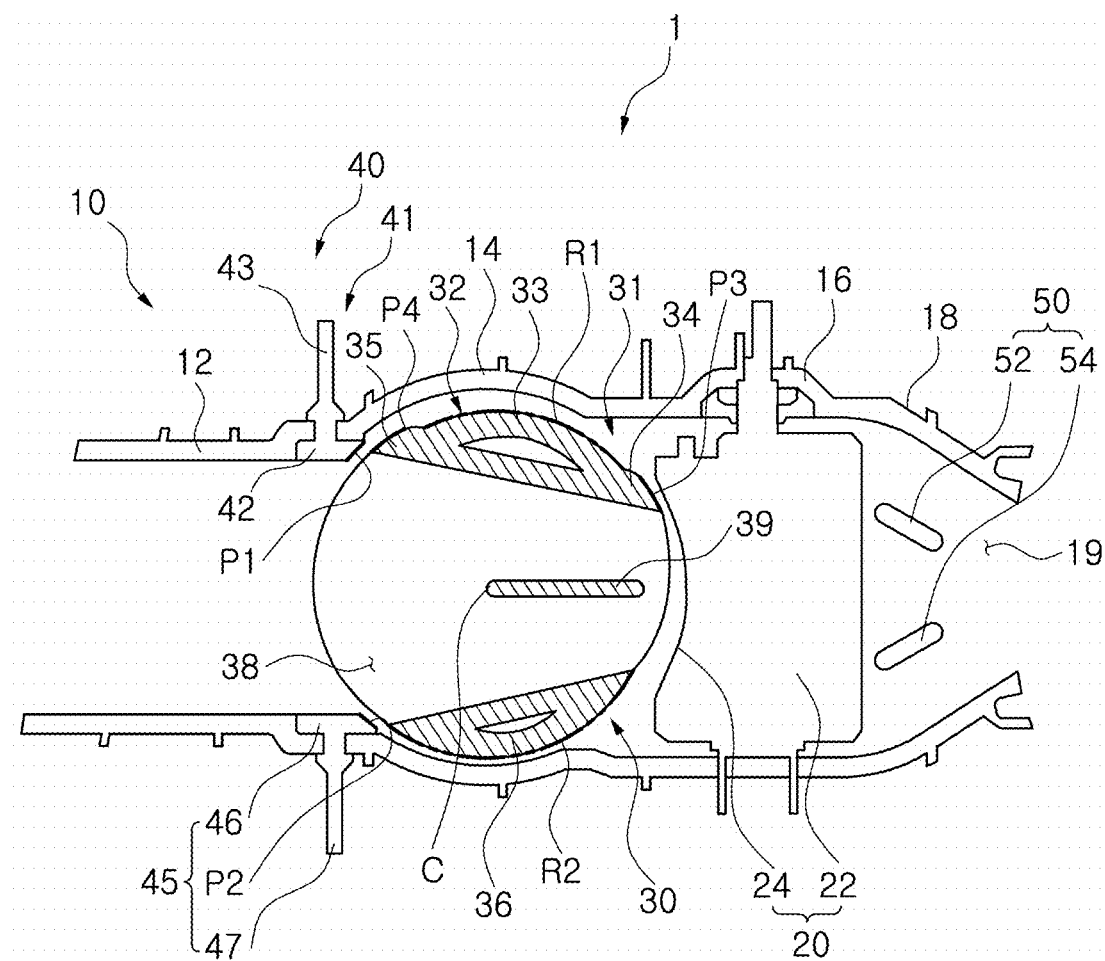
FIG. 13 is a cross-sectional view illustrating that the opening/closing part in accordance with the embodiment of the present disclosure includes first and second protrusions.
Figure 14:
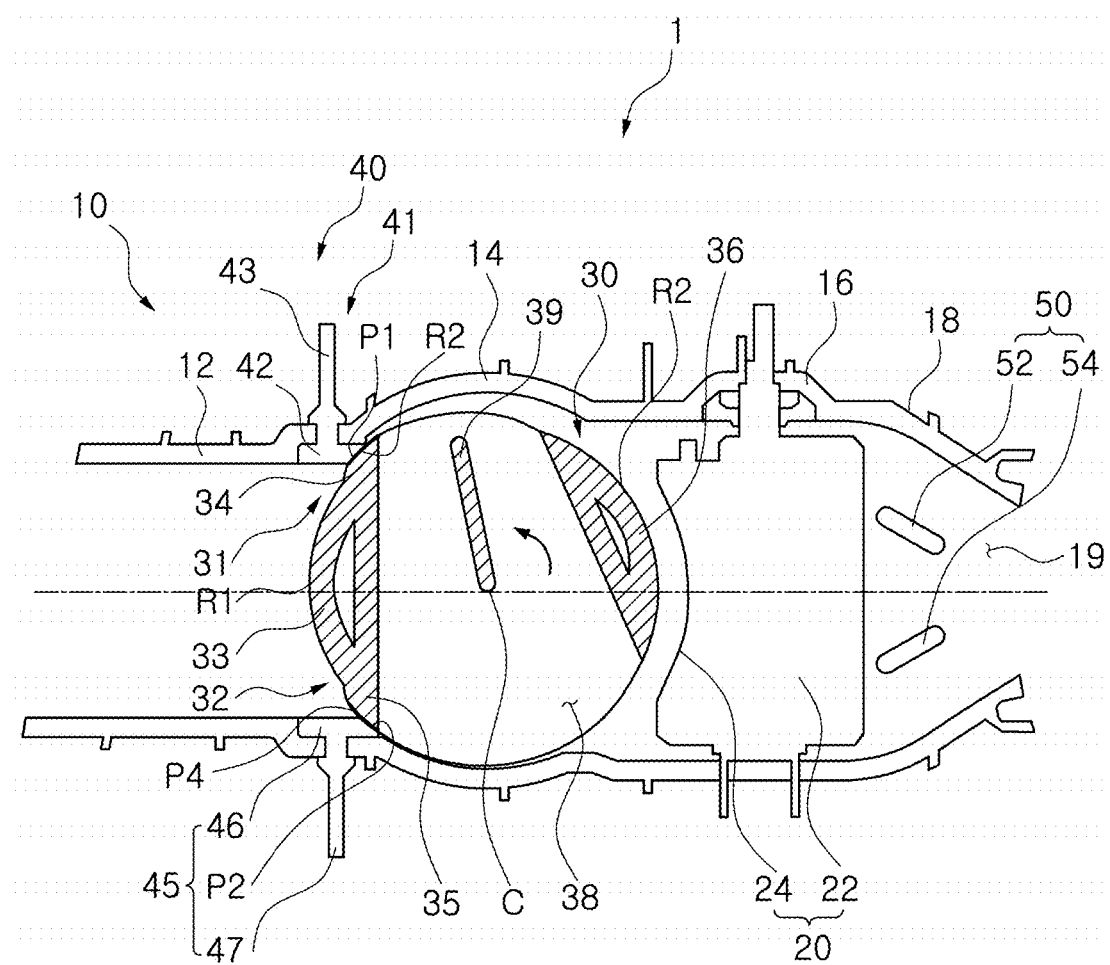
FIG. 14 is a cross-sectional view illustrating that the first and second protrusions in accordance with the embodiment of the present disclosure are brought into contact with the airtightness maintaining part.

FIG. 13 is a cross-sectional view illustrating that the opening/closing part in accordance with the embodiment of the present disclosure includes first and second protrusions, and FIG. 14 is a cross-sectional view illustrating that the first and second protrusions in accordance with the embodiment of the present disclosure are brought into contact with the airtightness maintaining part.

As illustrated in FIGS. 13 and 14, the opening/closing part 32 of the second adjusting part 30 may further include a second protrusion 35 which protrudes from the other side of the curved body 33 and is brought into contact with the airtightness maintaining part 40 when the curved body 33 blocks the inside of the duct part 10.

Based on the curved body 33, the first protrusion 34 is located on one side of the curved body 33, and the second protrusion 35 is located on the other side of the curved body 33. The outer curved surface of the first protrusion 34 is the first contact curved surface P3, and the outer curved surface of the second protrusion 35 is a second contact curved surface P4.

When the second adjusting part 30 is rotated in the counterclockwise direction to close the duct part 10, the first contact curved surface P3 is brought into contact with the first side surface P1, and the second contact curved surface P4 is brought into contact with the second side surface P2.

Figure 15:
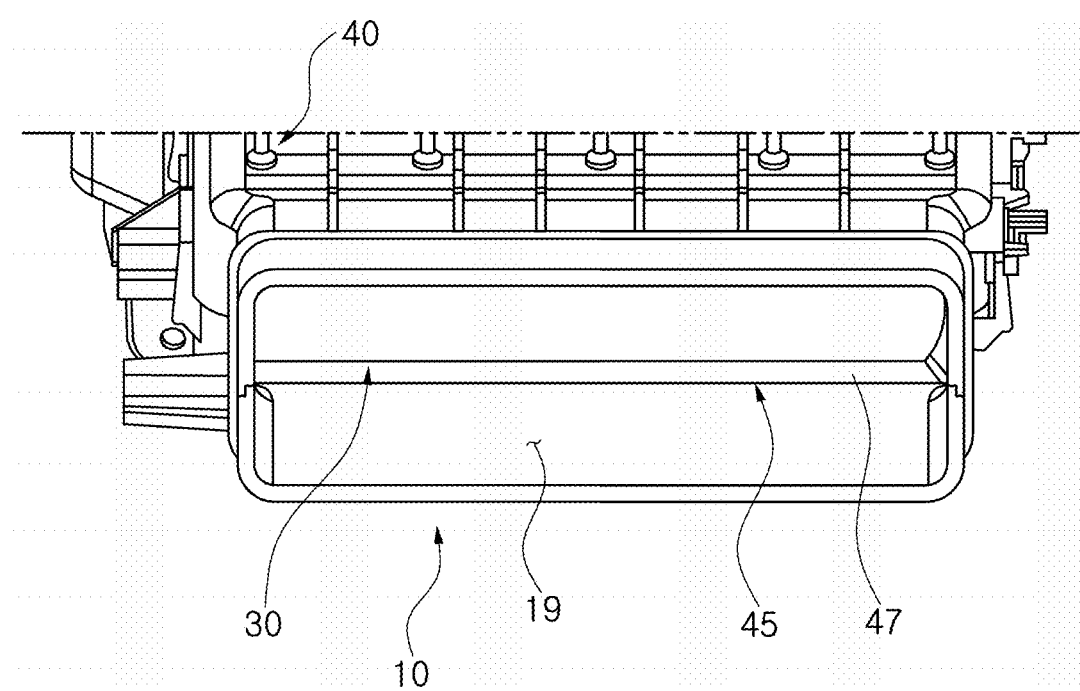
FIG. 15 is a diagram illustrating that an extension piece protrudes toward the bottom of the second adjusting part in accordance with the embodiment of the present disclosure.
Figure 16:
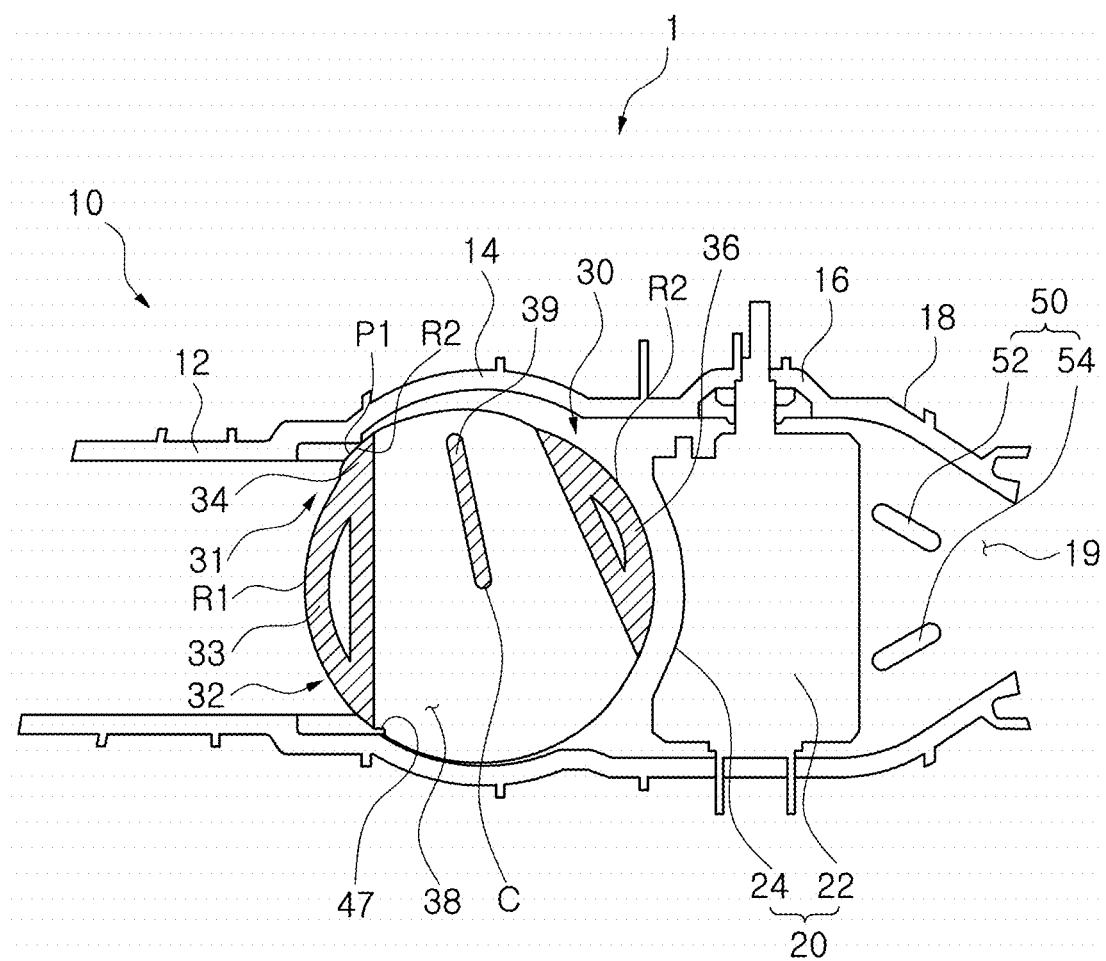
FIG. 16 is a cross-sectional view illustrating that the extension piece protrudes toward the bottom of the second adjusting part in accordance with the embodiment of the present disclosure.

FIG. 15 is a diagram illustrating that an extension piece protrudes toward the bottom of the second adjusting part in accordance with the embodiment of the present disclosure, and FIG. 16 is a cross-sectional view illustrating that the extension piece protrudes toward the bottom of the second adjusting part in accordance with the embodiment of the present disclosure.

As illustrated in FIGS. 15 and 16, when the second adjusting part 30 is in the close mode to close the duct part 10, an extension piece 47 extended from a second protrusion piece of the second sealing part 45 is extended toward the discharge port 19 through the bottom of the second adjusting part 30.

Since the elastic extension piece 47 is located between the second adjusting part 30 and the duct part 10, the sealing performance of the second adjusting part 30 in the downward direction is improved.

Figure 17:
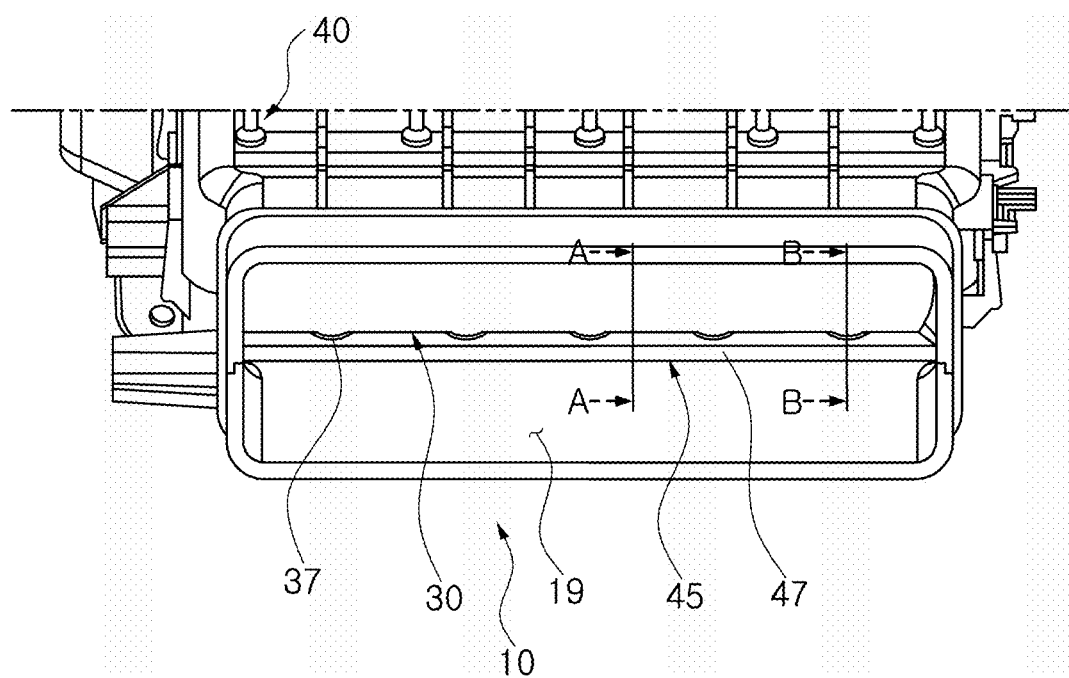
FIG. 17 is a diagram illustrating that a protrusion is extended from the bottom of the second adjusting part in accordance with the embodiment of the present disclosure.
Figure 18:
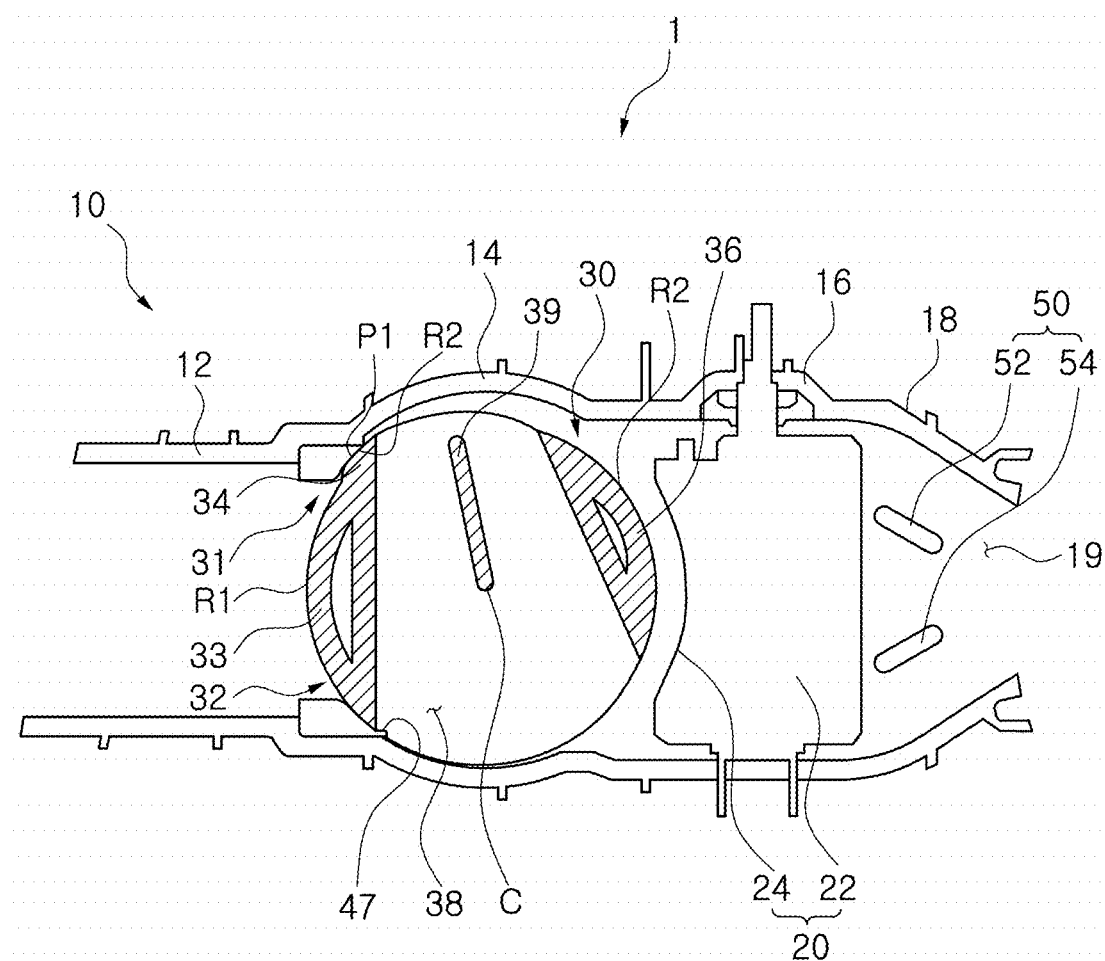
FIG. 18 is a cross-sectional view taken along the line A-A of FIG. 17.
Figure 19:
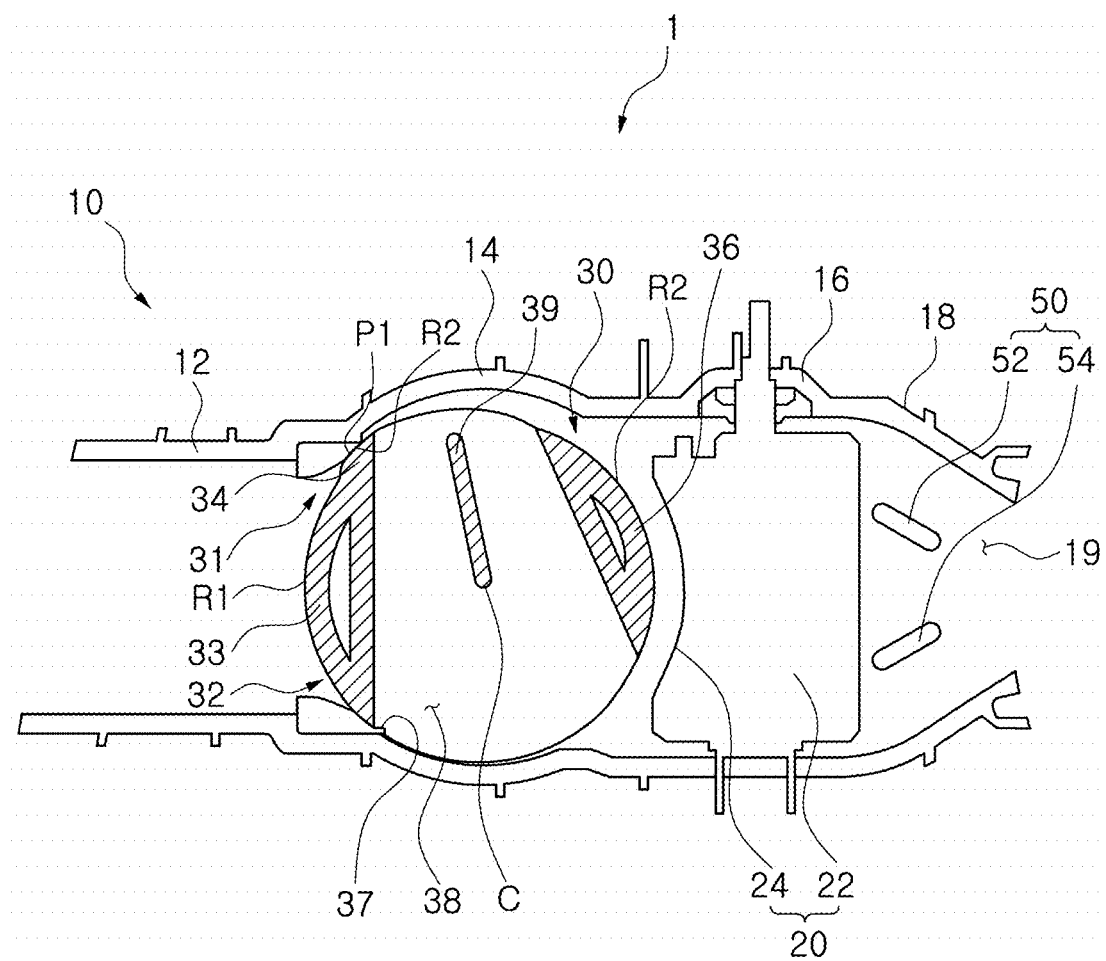
FIG. 19 is a cross-sectional view taken along the line B-B of FIG. 17.

FIG. 17 is a diagram illustrating that a protrusion is extended from the bottom of the second adjusting part in accordance with the embodiment of the present disclosure, FIG. 18 is a cross-sectional view taken along the line A-A of FIG. 17, and FIG. 19 is a cross-sectional view taken along the line B-B of FIG. 17.

When the second adjusting part 30 is in the close mode to close the duct part 10 as illustrated in FIGS. 17 to 19, a protrusion 37 protruding from the bottom of the second adjusting part 30 is installed. Therefore, since the protrusion 37 of the second adjusting part 30 is inserted into the extension piece 47, the sealing performance of the second adjusting part 30 in the downward direction can be improved.

Hereafter, the operation state of the air vent 1 for a vehicle in accordance with the embodiment of the present disclosure will be described in detail with reference to the accompanying drawings.

When the air flow A discharged from the air vent 1 for a vehicle is controlled to move downward as illustrated in FIG. 5, the second adjusting part 30 is rotated upward. Therefore, the air introduced into the duct part 10 through the first connection duct 12 passes through the hollow portion 38 of the second adjusting body 31, and is guided toward the duct part 10 and the first guide 52. The air flow A passing between the duct part 10 and the first guide 52 is guided in a downward oblique direction along the exit duct 18, and discharged to the outside of the discharge port 19.

When the air flow A discharged from the air vent 1 for a vehicle is controlled to move straight as illustrated in FIG. 3, the second adjusting part 30 is set to the initial position. At this time, since the internal member 39 of the second adjusting part 30 is installed in a horizontal direction, the air flow A passing through the hollow portion 38 is guided straight toward the discharge port 19, and discharged to the outside of the discharge port 19.

When the air flow A discharged from the air vent 1 for a vehicle is controlled to move upward as illustrated in FIG.

6, the second adjusting part 30 is rotated downward. Therefore, the air introduced into the duct part 10 through the first connection duct 12 passes through the hollow portion 38 of the second adjusting body 31, and is guided toward the duct part 10 and the second guide 54. The air flow A passing between the duct part 10 and the second guide 54 is guided in an upward oblique direction along the exit duct 18, and discharged to the outside of the discharge port 19.

When the air flow A discharged from the air vent 1 for a vehicle is blocked as illustrated in FIG. 4, the second adjusting part 30 is rotated in such a direction that the hollow portion 38 faces the duct part 10. Furthermore, since the second adjusting body 31 blocks the inside of the first connection duct 12, the air flow A moved toward the discharge port 19 is blocked.

At this time, the first contact curved surface P3 of the first protrusion 34 is brought into contact with the first side surface P1 of the first sealing protrusion 42, and the edge of the opening/closing part 32 located on the opposite side of the first protrusion 34 is brought into contact with the second side surface P2 of the second sealing protrusion 46. Thus, the sealing performance is improved, and operation noise is reduced.

In accordance with the embodiment of the present disclosure, the function of a damper which adjusts the direction of air passing through the inside of the duct part 10 or blocks the movement of the air is implemented by a single member, which makes it possible to reduce the manufacturing cost. Furthermore, since the elastic airtightness maintaining part 40 is brought into contact with the second adjusting part 30, the improved sealing performance can be provided, and the operation noise of the second adjusting part 30 can be reduced. Furthermore, the driving part is installed to operate the second adjusting part 30, and a separate actuator is installed to automatically operate the first adjusting part 20. Therefore, the use of the driving device can be minimized, and the manufacturing cost can be reduced.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An air vent for a vehicle, comprising:
a duct part having an internal path through which air is moved;
a first adjusting part rotatably installed in the duct part, and configured to guide a discharge direction of the air while rotated in a side-to-side direction;
a second adjusting part rotatably installed in the duct part with the first adjusting part, and configured to guide the discharge direction of the air or block an air flow passing through the duct part, while rotated in a top-to-bottom direction; and
an airtightness maintaining part fixed to the duct part facing the second adjusting part, and configured to block the movement of the air while brought into contact with the second adjusting part for opening/closing the duct part,
wherein the second adjusting part comprises:
a second adjusting body rotatably installed in the duct part; and
a plate-shaped internal member fixed to a hollow portion formed in the second adjusting body,
wherein the second adjusting part comprises:
an opening/closing part located on one side of the internal member, and configured to close the inside of the duct part when rotated and brought into contact with the airtightness maintaining part; and
a base part installed at a position facing the opening/closing part with the internal member provided therebetween, and
wherein the opening/closing part comprises:
a curved body having a convexly curved surface formed on the outside thereof; and
a first protrusion protruding from one side of the curved body, and brought into contact with the airtightness maintaining part when the curved main body blocks the inside of the duct part.

2. The air vent of claim 1, wherein the first adjusting part comprises:
a first adjusting body rotatably installed in the duct part; and
a side groove formed on a side surface of the first adjusting body, facing the second adjusting part.

3. The air vent of claim 1, wherein the second adjusting body has a cylindrical shape, and adjusts the direction of the air passing through the inside of the duct part or blocks the movement of the air according to the rotation direction thereof.

4. The air vent of claim 1, wherein the opening/closing part further comprises a second protrusion protruding from the other side of the curved body, and brought into contact with the airtightness maintaining part when the curved body blocks the inside of the duct part.

5. The air vent of claim 1, wherein a curved surface formed on the outside of the base part has a smaller curvature than the curved surface formed on the outside of the curved body.

6. The air vent of claim 1, wherein the airtightness maintaining part comprises:
an elastic first sealing part protruding from one side of the duct part to the inside of the duct part, and configured to maintain airtightness while brought into contact with the opening/closing part, when the second adjusting part closes the duct part; and
an elastic second sealing part protruding from the other side of the duct part to the inside of the duct part, and configured to maintain airtightness with the first sealing part while brought into contact with the opening/closing part, when the second adjusting part closes the duct part.

7. The air vent of claim 6, wherein the first sealing part comprises:
a first sealing protrusion protruding to the inside of the duct part, and having a first side surface brought into contact with the opening/closing part; and
a first extension extended from the first sealing protrusion and installed through the duct part.

8. The air vent of claim 6, wherein the second sealing part comprises:
a second sealing protrusion protruding to the inside of the duct part, and having a second side surface brought into contact with the opening/closing part; and
a second extension extended from the second sealing protrusion and installed through the duct part.

9. An air vent for a vehicle, comprising:
a duct part having an internal path through which air is moved;
a first adjusting part rotatably installed in the duct part, and configured to guide a discharge direction of the air while rotated in a side-to-side direction;
a second adjusting part rotatably installed in the duct part with the first adjusting part, and configured to guide the discharge direction of the air or block an air flow passing through the duct part, while rotated in a top-to-bottom direction; and
an airtightness maintaining part fixed to the duct part facing the second adjusting part, and configured to block the movement of the air while brought into contact with the second adjusting part for opening/closing the duct part,
wherein the second adjusting part comprises:
a second adjusting body rotatably installed in the duct part; and
a plate-shaped internal member fixed to a hollow portion formed in the second adjusting body,
wherein the second adjusting part comprises:
an opening/closing part located on one side of the internal member, and configured to close the inside of the duct part when rotated and brought into contact with the airtightness maintaining part; and
a base part installed at a position facing the opening/closing part with the internal member provided therebetween,
wherein the airtightness maintaining part comprises:
an elastic first sealing part protruding from one side of the duct part to the inside of the duct part, and configured to maintain airtightness while brought into contact with the opening/closing part, when the second adjusting part closes the duct part; and
an elastic second sealing part protruding from the other side of the duct part to the inside of the duct part, and configured to maintain airtightness with the first sealing part while brought into contact with the opening/closing part, when the second adjusting part closes the duct part, and
wherein the first sealing part comprises:
a first sealing protrusion protruding to the inside of the duct part, and having a first side surface brought into contact with the opening/closing part; and
a first extension extended from the first sealing protrusion and installed through the duct part.

* * * * *